3,305,464
POLYMERIZATION OF TRIOXANE
Nelson S. Marans, 12120 Kerwood Road, Silver Spring, Md. 20904, and Forrest A. Wessells, 740 E. Lake Ave., Baltimore, Md. 21210
No Drawing. Filed Oct. 1, 1965, Ser. No. 492,330
9 Claims. (Cl. 204—159.21)

This application is a continuation-in-part of our previously filed application 196,606, filed May 22, 1962, now abandoned.

The present invention relates to high molecular weight polyoxymethylene polymers, and more specifically to an improved method for obtaining polyoxymethylene polymers by the irradiation of trioxane.

It has heretofore been disclosed that useful high molecular weight polyoxymethylene polymers may be obtained by irradiating trioxane with high energy ionizing irradiation. The prior art indicates that reasonable yields of polyoxymethylene polymer may be obtained if trioxane is irradiated in the solid phase and subsequently allowed to polymerize at elevated temperatures. The total yield and molecular weight of the polyoxymethylene polymer obtained by the irradiation of trioxane is dependent on several factors, among them being the irradiation dosage and the subsequent polymerization period. During the subsequent polymerization period the activated polymerization sites which are induced in the trioxane by irradiation commence to polymerize. The rate of polymerization is generally temperature dependent and it is found that polymer growth does not occur to any measurable extent below a temperature of about 25° C. Hence, the normal practice in the production of polyoxymethylene by irradiation of trioxane involves irradiating the trioxane at a temperature above or somewhat below the threshold polymerization temperature and immediately thereafter holding the irradiated polymer at a temperature above polymerization temperature to obtain a desired yield.

Obviously, for reasons of economy the polymerization period (which requires heating of the irradiated trioxane) should be of short duration as possible. However, since irradiated trioxane requires rather lengthy heating periods to achieve substantial polymerization, it is generally found that even under the best of conditions the heating or polymerization step represents a sizeable cost in the production of polyoxymethylene by irradiation. Therefore, any means by which the heating, i.e. polymerization, period required in the production of polyoxymethylene could be reduced would represent a more economical method for producing polyoxymethylene by irradiation, particularly in large scale operations.

It is therefore an object of the present invention to provide an improved method for producing high molecular weight polymers by irradiation of trioxane.

It is another object to provide a method for polymerizing trioxane by irradiation which requires a minimum heating period to obtian substantial yields of high molecular weight polyoxymethylene polymer.

It is a further object to provide an improved method for producing high moecular weight polyoxymethylene polymer by the irradiation of solid state trioxane which may be conveniently used with existing processing equipment.

These and still further objects of the present invention will become readily apparent to one skilled in the art from the following detailed description and specific examples.

In general, the present invention involves an improved method for polymerizing trioxane by irradiation which comprises irradiating trioxane in the solid state with high energy ionizing radiation at a temperature below the threshold polymerization temperature of said irradiated trioxane; subsequently storing said irradiated trioxane at a temperature below its polymerization temperature for up to about 7 days; and finally heating said aged trioxane to a temperature above its polymerization temperature and aging it at said polymerization temperature until a desirable degree of polymerization has taken place. After polymerization has reached a desirable degree, the non-polymerized trioxane monomer which remains may be conveniently removed from the polymeric mass by distillation or by extraction with a suitable solvent for the trioxane.

More specifically, we have found that the amount of polymerization obtained from a given amount of irradiation and subsequent heating may be substantially increased if instead of either irradiating solid trioxane at above its polymerization temperature to achieve polymerization simultaneously with irradiation, or immediately heating irradiated trioxane to above its polymerization temperature after irradiation, the trioxane is stored for a period at a temperature below its polymerization temperature before it is heated to a point at which polymerization will occur. Normally it would be expected that any delay between irradiation and polymerization would result in a decrease in yield due to the fact expiration or decay in the number of activated polymerization sites which are induced by the irradiation would be expected to occur. Contrary to this expectation we have determined that storing at below the polymerization temperature of about 25° C. for a period of up to about 7 days between irradiation and polymerization will result in a substantial increase in both polymer yield and molecular weight upon subsequent polymerization at elevated temperatures when compared to the prior art process which involves heating or polymerizing simultaneously with irradiation or immediately thereafter.

In other words, it is found that when the storing or holding step disclosed in the present invention is utilized between irradiation and polymerization, a substantial increase in yield and molecular weight of the resulting polyoxymethylene polymer is obtained for a given heating period over that obtained if the heating period were conducted simultaneously or immediately following irradiation.

In the practice of the present invention, the solid trioxane is maintained at a temperature below about 25° C. and subjected to from about 0.001 to about 10.0 megarads of high energy ionizing irradiation. The irradiation may consist of electrons possessing energies of greater than about 15 ev. or may consist of any other ionizing irradiation such as protons, alpha particles, deuterons, neutrons, X-rays, or gamma rays. While irradiation dosages may range as high as 10 megarads, dosages below about 5 megarads and preferably in the range of from about 0.02 to about 1.0 megarad may be used to excellent advantage. It is found that the entire process may be conducted open to the atmosphere if desired; however, the use of inert atmosphere such as high vacuum, nitrogen, argon, or helium will prevent any possible reaction of activated polymerization sites with oxygen.

Subsequent to irradiation, the irradiated trioxane which contains activated polymerization sites is stored at a temperature which is below that at which polymerization will take place. In general substantially no polymerization occurs at a temperature below about 25° C. Hence, in the practice of the present invention, the irradiated trioxane may be advantageously aged at about room temperature. In general temperatures ranging from 0 to 25° C. are adequate.

If it is desired, the aging step of the present process may be carried out for a period of up to about 7 days with no substantial loss of activated polymerization sites. This means that from a practical standpoint irradiated trioxane, which is to be subsequently polymerized, may be stored for long periods which in turn permits the irradiation of large batches of trioxane prior to subsequent polymerization. Due to the fact that application of the radiation is generally the limiting factor in the rate of production of polyoxymethylene by irradiation of trioxane, use of the present process permits the accumulation of large batches of activated monomer which may be scheduled for polymerization at a later and perhaps more convenient date.

While the storage may extend as long as 7 days if manufacturing schedules so require, it is found that as little as about 2 hours aging will produce a substantial benefit.

Subsequent to aging, the irradiated trioxane is heated to above its polymerization temperature of about 25° C. whereby polymerization will spontaneously occur over a period ranging up to about 24 hours depending upon the temperature used and the degree of polymerization desired. The rate at which polymerization occurs, as mentioned previously, is temperature dependent below the monomer melting point and will generally increase with increased temperature below the monomer melting point and decrease above the monomer melting point. For general use where a large degree of polymerization is desired, a polymerization temperature slightly below the melting point of trioxane (about 62° C.) is generally preferred. Thus it is found that a polymerization temperature ranging from about 55 to 62° C. results in the obtaining of highly crystalline polymer within a reasonable time period. At a temperature of from 55 to 62° C., it is generally fuond that from about 25 to about 60% yield can be obtained depending on irradiation dosage within 30 to 300 minutes. Extending polymerization periods for a longer length of time results in still further yields of polymer. However, the rate of polymerization tends to slacken off considerably after the first 5 hours.

When it is desired to obtain a polyoxymethylene which does not have a particularly high order of crystallinity, the polymerization step may be conducted at a temperature over the melting point of the trioxane. While such treatment will also give rapid polymerization of the irradiated trioxane, it is generally found that melting destroys the crystalline order of the original trioxane crystal which results in a final polyoxymethylene polymer having a reduced degree of crystallinity and orientation as compared to the non-melted product.

After the irradiated trioxane has been permited to polymerize to a desired degree, the non-polymerized trioxane is conveniently removed from the polymer by evaporation or by extraction with solvents such as water, methanol, acetone, methylene chloride, or practically any solvent for trioxane which does not dissolve the polyoxymethylene polymer. Subsequent drying at moderate temperatures below the melting point of the polymer will result in a snow-white polyoxymethylene having desirable physical characteristics.

The precise characteristics of the polymer obtained by the practice of the present invention will depend on the specific reaction conditions used and the condition of the trioxane started with. Furthermore, the yield polymer obtained is dependent on the time permitted for the aging and polymerization steps. Therefore, the exact yield obtained in any given system will largely depend on economic considerations which are determined by the operator who determines at which point the benefits of increasing yield and/or molecular weight is no longer commensurate with increasing aging and/or polymerization.

Having described the general aspects of the present invention, the following detailed specific examples are given to illustrate specific embodiments thereof:

*Example I*

Trioxane was distilled under a stream of nitrogen into a 10 mm. glass tube. The tube was immersed in a Dry Ice-acetone bath and than evacuated to a 1.5 mm. of Hg pressure and sealed. The tubes were then irradiated at a temperature of 25° C. to a dosage of 0.3 megarad in a single pass. Of the eight tubes irradiated, two were immersed immediately in a constant temperature bath held at 55° C. and polymerized for five hours. Two others were stored at 25° C. for one day before polymerization at 55° C., two for five hours, two for four days, and two for seven days. The percent conversion and reduced specific viscosity of the resulted products are tabulated in the table below:

| Time of Storing After Irradiation and Before Polymerization (days) | Conversion (Percent) | RSV (dl./g.) |
|---|---|---|
| 0 | 36.8 | 2.14 |
| 0 | 36.2 | 2.27 |
| 1 | 45.5 | 2.76 |
| 1 | 47.0 | 2.64 |
| 4 | 47.7 | 2.45 |
| 4 | 46.6 | 2.69 |
| 7 | 42.3 | 2.44 |
| 7 | 46.2 | 2.56 |

In the above table the reduced specific viscosity (RSV) was determined using a concentration of 0.1 gram of polymer dissolved in 100 ml. of gamma butyrolactone maintained at a temperature of 135° C., and is expressed in units of deciliters per gram.

*Example II*

Trioxane as obtained from the manufacturer was melted and filtered to remove any polymeric products. The molten monomer was then permitted to flow into 10 mm. diameter glass tubes. The tubes were sealed at less than 1.0 mm. Hg pressure while being maintained in a Dry Ice-acetone bath. The samples were then irradiated, aged and polymerized in the manner set forth in Example I. The results of the tests are tabulated below:

| Time of Storing After Irradiation and Before Polymerization (days) | Conversion (Percent) | RSV (dl./g.) |
|---|---|---|
| 0 | 30.5 | 1.28 |
| 0 | 32.6 | 1.27 |
| 1 | 38.2 | 1.51 |
| 1 | 41.5 | 1.60 |
| 2 | 37.9 | 1.69 |
| 2 | 38.0 | 1.57 |
| 4 | 37.2 | 1.66 |
| 4 | 39.8 | 1.71 |

*Example III*

Trioxane samples prepared as in Example II were irradiated at a dose of 0.3 mr. at a temperature of 25° C. The irradiated samples were then stored for various times and temperature prior to being polymerized at 55° C. for five hours. The percentage polymerization and reduced specific viscosity obtained in these samples is summarized below.

| Sample No. | Time of Storage (hrs.) | Temperature of Storage °C. | Percentage Polymerization | RSV (dl./g.) |
|---|---|---|---|---|
| 1 | 0 | 25 | 28.0 | 1.09 |
| 2 | 0 | 25 | 27.5 | 1.21 |
| 3 | 1 | 25 | 26.4 | 1.47 |
| 4 | 1 | 25 | 26.7 | 1.34 |
| 5 | 2 | 25 | 28.8 | 1.29 |
| 6 | 2 | 25 | 27.6 | 1.55 |
| 7 | 4 | 25 | 32.9 | 1.78 |
| 8 | 4 | 25 | 32.9 | 1.58 |
| 9 | 24 | −80 | 27.3 | 1.00 |
| 10 | 24 | −80 | 26.6 | 1.08 |
| 11 | 24 | 0 | 28.9 | 1.39 |
| 12 | 24 | 0 | 28.7 | 1.30 |

It is noted that in samples 3–8 and 11 and 12 wherein a storage step at 0 to 25° C. is conducted for 1 to 24 hours, enhanced yields of RSV's are obtained.

*Example IV*

To illustrate the necessity of having a polymerization step carried out at a temperature in excess of 25° C., a sample series was prepjared as in Example II. The samples were irradiated at 25° C. to a dose of 0.3 mr. The irradiated samples were then stored at 25° C. for periods of 0 to 96 hours, then immediately analyzed without any polymerization step at elevated temperature being conducted. The results are summerized below.

| Sample No. | Time of Storage | Percent Polymerization |
|---|---|---|
| 1 | 0 | 0.0±0.0 |
| 2 | 4.5 | 0.0±0.0 |
| 3 | 24 | 0.0±0.0 |
| 4 | 48 | 0.0±0.0 |
| 5 | 96 | 0.0±0.0 |

The above data illustrates the fact that no detectable polymerization occurs at temperatures below about 25° C. Hence, it is seen that the enhanced yields and RSV's obtained by use of the present prepolymerization storage technique is not attributable to a mere extension of the polymerization period.

The above examples clearly indicate that if irradiated trioxane is aged at sub polymerization temperatures for a period of as little as four hours, both the yield and reduced specific viscosity is substantially increased over that obtained by merely polymerizing for a similar period immeditely after irradiation.

We claim:

1. A method for producing high molecular weight polyoxymethtylene which comprises irradiating trioxane in the solid state at a temperature below about 25° C. with high energy ionizing irradiation to induce activated polymerization sites in said trioxane, storing said trioxane for a period greater than about 2 hours at a temperature of from about 0° C. to about 25° C. in the absence of irradiation, heating said stored trioxane to a temperature above the threshold polymerization temperature thereof for a period sufficient to cause substantial polymerization therein, and recovering non-polymerized trioxane from the polymerized mass.

2. The method of claim 1 wherein said trioxane is irradiated to a dosage of from about 0.001 to about 10 megarads.

3. The method of claim 2 wherein the irradiation comprises high energy electrons.

4. The method of claim 1 wherein the storing period after irradiation and prior to polymerization is from about 2 hours to about 7 days.

5. The method of claim 1 wherein said irradiated trioxane is heated to a temperature of from about 55° C. to 62° C.

6. The method of claim 5 wherein said irradiated trioxane is heated for a period of from about 10 minutes to about 1 day.

7. A method of producing high molecular weight polyoxymethylene which comprises irradiating trioxane in the solid state with from about 0.01 to about 2.0 megarads high energy ionizing irradiation at a temperature below about 25° C., storing said irradiated trioxane at a temperature from about 0° C. to about 25° C. for a period of from about 2 hours to about 7 days in the absence of irradiation, polymerizing said aged trioxane at a temperature from about 55° C. to about 62° C. for a period of from about 0.1 to about 10 hours, and recovering high molecular weight polyoxymethylene polymer from non-polymerized trioxane.

8. The method of claim 7 wherein said polyoxymethylene polymer is recovered by evaporating the non-polymerized trioxane therefrom.

9. The method of claim 7 wherein the non-polymerized trioxane is separated from said polyoxymethylene polymer by solvent extraction.

References Cited by the Examiner

UNITED STATES PATENTS

| 3,093,560 | 6/1963 | Fourcade | 204—154 |
| 3,107,208 | 10/1963 | Chachaty | 204—154 |
| 3,242,063 | 3/1966 | Okamura et al. | 204—154 |

OTHER REFERENCES

Okamura et al.: Post Irradiation Polymerization of Trioxane, Annual Report of the Japanese Assoc. for Radiation Research of Polymers, vol. 3, Oct. 10, 1962, pages 299–310.

Okamura et al.: Radiation Induced Polymerization of Trioxane Isotopes and Radiation, vol. 3, No. 5 (1960), pages 416–417.

Okamura et al.: Experiments on Low Temperature Radiation Polymerization, Annular Report of the Japanese Assoc. for Radiation Research on Polymers, vol. 1 (1959), pages 143–149.

SAMUEL H. BLECH, *Primary Examiner.*

MURRAY TILLMAN, *Examiner.*

N. F. OBLON, R. B. TURER, *Assistant Examiners.*